United States Patent [19]

Protze et al.

[11] 4,407,166
[45] Oct. 4, 1983

[54] LONGITUDINALLY AND ANGULARLY ADJUSTABLE STEERING COLUMN

[75] Inventors: Dieter Protze, Wolfsburg; Udo Voigt, Cremlingen, both of Fed. Rep. of Germany

[73] Assignee: Volkswagenwerk AG, Wolfsburg, Fed. Rep. of Germany

[21] Appl. No.: 251,739

[22] Filed: Apr. 7, 1981

[30] Foreign Application Priority Data

Apr. 26, 1980 [DE] Fed. Rep. of Germany ....... 3016212

[51] Int. Cl.³ .......................... B62D 1/18; G05G 5/22
[52] U.S. Cl. ........................................ 74/493; 74/531; 188/67; 403/104; 403/374
[58] Field of Search ..................... 74/493, 531; 188/67; 403/104, 374; 280/775

[56] References Cited

U.S. PATENT DOCUMENTS

| | | | |
|---|---|---|---|
| 2,513,889 | 7/1950 | Nilsson | 403/104 X |
| 2,583,880 | 1/1952 | Premo | 403/374 |
| 3,245,282 | 4/1966 | Kimberlin | 74/493 |
| 3,724,290 | 4/1973 | Burton | 74/493 |
| 4,018,101 | 4/1977 | Mihalic | 74/493 |

FOREIGN PATENT DOCUMENTS 1555465 11/1969 Fed. Rep. of Germany .
1929784 12/1969 Fed. Rep. of Germany .
2204628 8/1973 Fed. Rep. of Germany .

*Primary Examiner*—Allan D. Herrmann
*Attorney, Agent, or Firm*—Spencer, Kaye & Frank

[57] ABSTRACT

A longitudinally and angularly adjustable vehicle steering column has two telescopically coupled steering column parts. One part is secured to a vehicle frame for swinging motion about a horizontal axis while the other part carries the steering wheel. The steering column is supported by a two-part strut. One strut part is in engagement with the steering column and the other strut part is secured to the vehicle frame for swinging motion about a horizontal axis. The strut parts are bar-like components articulated to one another. One of the strut parts extends parallel to the steering column axis. A locking bar mounted on only one of the two said steering column parts extends substantially parallel to the column axis and projects into a clamping sleeve mounted on the other of the two steering column parts. The clamping sleeve also receives one of the strut parts. A tightening mechanism cooperates with the clamping sleeve for simultaneously immobilizing the locking bar and the strut part in the clamping sleeve.

4 Claims, 3 Drawing Figures

LONGITUDINALLY AND ANGULARLY ADJUSTABLE STEERING COLUMN

BACKGROUND OF THE INVENTION

This invention relates to a steering column whose length and inclination is adjustable. The steering column which, in particular, is used in automotive vehicles, has two telescopically and relatively non-rotatably interengaging steering column parts. A first one of the column parts is articulated to the vehicle for pivotal motion about a horizontal axis, while on the second one of the steering column parts there is relatively non-rotatably mounted a steering wheel. One end of a strut which, for purposes of length adjustment, is made of several parts, engages the second steering column part, while the other end of the strut is articulated to the vehicle for pivotal motion about a horizontal axis. Further, tightening mechanisms are provided for immobilizing the steering column in its longitudinally and angularly set position.

Steering columns of the above-outlined type, such as disclosed in German Laid-Open Application (Offenlegungsschrift) No. 2,204,628, have the advantage over other adjustable, but strutless steering columns (such as disclosed, for example, in German Pat. No. 1,555,465) that the range of their angular adjustability is significantly greater which may be desirable for facilitating getting into and out of the vehicle.

During operation of the vehicle the adjustable steering column and thus the steering wheel must remain immobilized in the set longitudinal and angular position. In German Laid-Open Application No. 2,204,628 and German Published Accepted Patent Application (Auslegeschrift) No. 1,929,784 there are shown structures where for the immobilization of the longitudinal and angular positions of the steering column two separately operated tightening mechanisms are required.

The adjustable steering column arrangement disclosed in German Pat. No. 1,555,465 has a single clamping device, into which extend respective locking bars at the upper column part and at the pivotal head thereof. This structure, however, does not take into account conditions that prevail in steering columns which include a support strut.

SUMMARY OF THE INVENTION

It is an object of the invention to provide an improved steering column of the above-outlined type which is provided with a support strut and which needs only a single tightening device for immobilizing the steering column in both the longitudinal and angular position.

This object and others to become apparent as the specification progresses, are accomplished by the invention, according to which, briefly stated, the support strut is formed of two rod-like strut parts articulated to one another; one strut part which forms one end of the strut is displaceable parallel to the axis of the steering column and extends in a clamping sleeve secured to one of the two steering column parts. Into the clamping sleeve there projects a locking bar which is secured only to the other of the two steering column parts and which extends substantially parallel to the axis of the steering column.

It is a particular advantage of the invention that it solves the above-stated object with a minimum requirement of space and additional structural components and without critical manufacturing tolerances.

DESCRIPTION OF THE PREFERRED EMBODIMENTS

Figure 1:
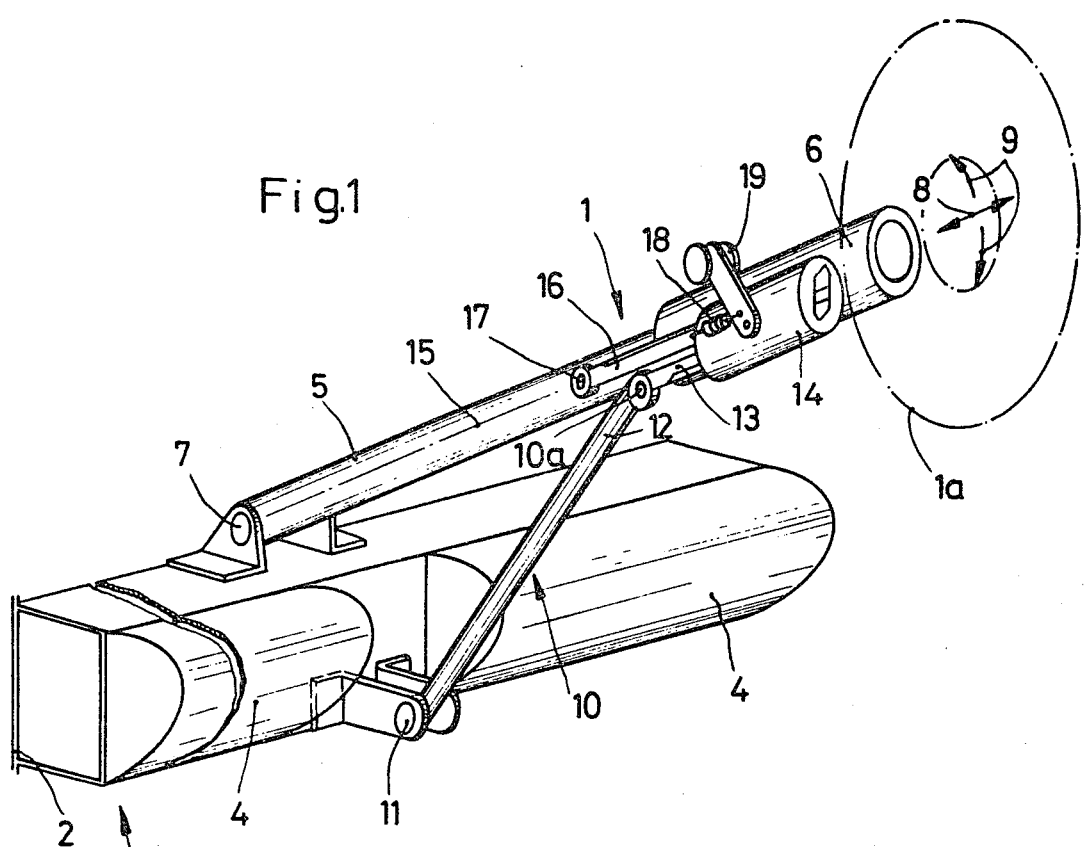
FIG. 1 is a perspective view of a preferred embodiment of the invention.

Turning first to FIG. 1, there is shown a steering column generally indicated at 1 which is pivotally mounted on a carrier 2 of a knee bar which is generally designated at 3 and which, at its face oriented towards the driver, carries a deformable pad 4. Mounting the steering column in this manner is particularly advantageous since the carrier 2 of the knee bar 3 is laterally supported on the rigid A-pillars of the vehicle.

The steering column 1 comprises two telescopically interconnected column parts 5 and 6. At its lower end the column part 5 is mounted on the knee bar carrier 2 for swinging motion about a pivot 7 having a horizontal axis. The other steering column part 6 is, at its upper end, relatively non-rotatably attached to a steering wheel 1a. The steering column part 6 is adjustable linearly with respect to the steering column part 5 towards or away from the driver as illustrated by the double-headed straight arrow 8 and the steering column as a whole is adjustable angularly as indicated by the double-headed arcuate arrow 9.

The steering column 1 is supported by a strut 10 which at its lower end is articulated to the carrier 2 for swinging motion about a pivot 11 having a horizontal axis. The strut 10 is formed of two strut parts 12 and 13 which are articulated to one another by a joint 10a.

The pad 4 is interrupted in the zone of the strut 10 so that the latter need not extend in front of the cushion where it would take up leg space.

For changing the length of the steering column 1, the upper steering column part 6 is moved relative to the lower steering column part 5 in the direction of the double-headed arrow 8 by applying an appropriately oriented force on the steering wheel. Further, by applying a properly oriented force on the steering wheel, there may be effected a pivotal motion of the steering column 1 about the horizontal axis of the pivot 7 in the direction of the double-headed arrow 9. Since during the pivotal motion of the steering column 1 about the horizontal axis of the pivot 7 the strut 10 is pivoting about another pivotal axis, namely that of the pivot 11 which is spaced from the pivot 7, the length of the strut 10 must change at least during the swinging motion of the steering column 1. For this purpose, the strut part 13 is slidably arranged in a clamping sleeve 14 which, in the embodiment shown in FIG. 1, is fixedly mounted on the upper steering column part 6 in an orientation parallel to the steering column axis 15. In addition to the strut part 13, a locking bar 16 also projects into the sleeve 14. The locking bar 16 is pivotally attached solely to the steering column part 5 and extends substantially parallel to the steering column axis 15.

When the length of the steering column 1 changes (movements of the upper column part 6 in the direction of the arrow 8), there thus occurs only a displacement of the clamping sleeve 14 relative to the strut part 13 and the locking bar 16. During pivotal motions of the steering column 1 in the direction of the arrow 9, on the other hand, there also occur relative shifts between the strut part 13 and the locking bar 16.

Figure 2:
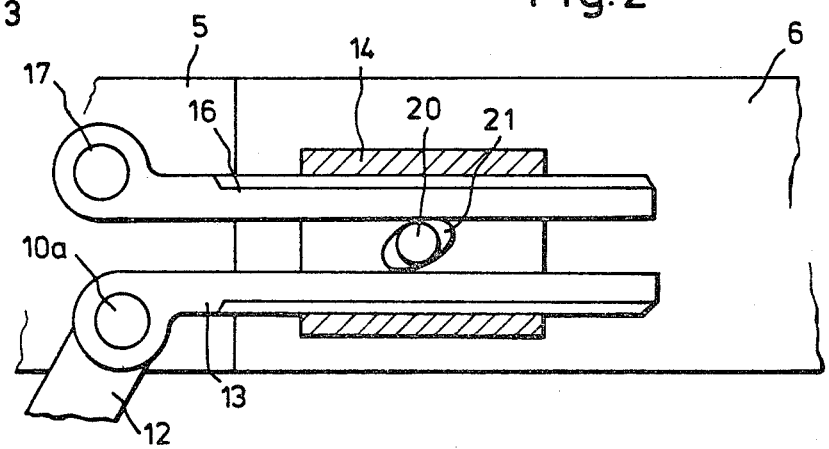
FIG. 2 is a partially sectional side elevational view of one part of the preferred embodiment of the invention shown in FIG. 1.

Also referring now to FIG. 2, an immobilization of the steering column 1 regarding both the above-noted two motions is effected by a single clamping device which comprises the clamping sleeve 14 and a spring-biased manually engageable handle 19 which is mounted on the clamping sleeve 14 and which is urged by the spring 18 in the direction of clamping. The handle 19 is connected to a shaft 20 which carries a spreader cam 21 for pressing the two flanking components 13 and 16 apart and against a prismatic seat formed within the clamping sleeve 14.

Figure 3:
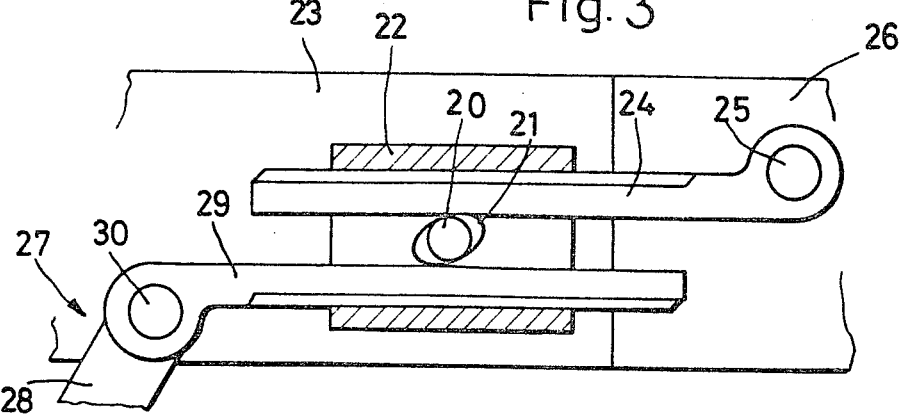
FIG. 3 is a partially sectional side elevational view of one part of another preferred embodiment of the invention.

Turning now to FIG. 3, the embodiment illustrated therein differs from that shown in FIG. 1 in that a clamping sleeve 22 is mounted on a lower steering column part 23 while a clamping bar 24 is articulated by means of a joint 25 to an upper steering column part 26. A strut 27 is formed of two strut parts 28 and 29 which are interconnected by means of a joint 30. The strut part 29 extends through the clamping sleeve 22. In this embodiment too, a single clamping device with clamping sleeve 22 and a dual wedge (cam) 21 effects the immobilization of the steering column 1 both in the longitudinally and in the angularly set position of the steering wheel.

It is to be understood that the strut may be arranged above the steering column. Expediently, at the pivots 7 and/or 11 springs are provided which support the steering column in the released state of the clamping device.

It will be understood that the above description of the present invention is susceptible to various modifications, changes and adaptations and the same are intended to be comprehended within the meaning and range of equivalents of the appended claims.

What is claimed is:

1. In a longitudinally and angularly adjustable vehicle steering column having an axis and including first and second steering column parts telescopically and relatively non-rotatably coupled to one another; said first steering column part being secured to a vehicle frame for swinging motion about a horizontally oriented axis; a steering wheel relatively non-rotatably mounted on said second steering column part; a steering column-supporting strut having first and second strut parts movable relative to one another; said first strut part being in engagement with said steering column and said second strut part being secured to said vehicle frame for swinging motion about a horizontally oriented axis; and tightening means for immobilizing said steering column in a set longitudinal and angular position thereof; the improvement wherein said first and second strut parts are bar-like components articulated to one another; said first strut part extending parallel to said axis of said steering column; a locking bar mounted on only one of the two said steering column parts and extending substantially parallel to said axis, said tightening means comprising a clamping sleeve mounted on the other of the two steering column parts; said first strut part and said locking bar projecting into said clamping sleeve and being slidable relative thereto in a released state of said tightening means; said tightening means further comprising means cooperating with said clamping sleeve for simultaneously immobilizing said locking bar and said first strut part in said clamping sleeve.

2. A steering column as defined in claim 1, wherein said locking bar is pivotally mounted on said only one of the two steering column parts.

3. A steering column as defined in claim 1, wherein said locking bar and said first strut part are spaced from one another in said clamping sleeve; and further wherein said means cooperating with said clamping sleeve includes a spreader cam situated in said clamping sleeve between said locking bar and said first strut part and an operating handle coupled to said spreader cam for setting said spreader cam into a position in which it clamps said locking bar and said first strut part against said clamping sleeve.

4. A steering column as defined in claim 1, wherein said means cooperating with said clamping sleeve comprises an operating handle having a first position in which said tightening means immobilizes said locking bar and said first strut part and a second position in which said locking bar and said first strut part are displaceable relative to said clamping sleeve; further comprising a spring means for urging said operating handle into said first position.

* * * * *